United States Patent
Stoker et al.

(10) Patent No.: US 6,913,855 B2
(45) Date of Patent: Jul. 5, 2005

(54) METHOD OF SYNTHESIZING ELECTROCHEMICALLY ACTIVE MATERIALS FROM A SLURRY OF PRECURSORS

(75) Inventors: Johnnie Stoker, Henderson, NV (US); James Hodge, Henderson, NV (US)

(73) Assignee: Valence Technology, Inc., Henderson, NV (US)

( * ) Notice: Subject to any disclaimer, the term of this patent is extended or adjusted under 35 U.S.C. 154(b) by 187 days.

(21) Appl. No.: 10/200,823

(22) Filed: Jul. 22, 2002

(65) Prior Publication Data

US 2004/0013943 A1 Jan. 22, 2004

(51) Int. Cl.$^7$ .......................... H01M 4/48; H01M 4/52; C01D 15/02; C01G 49/02; C01B 25/26
(52) U.S. Cl. .................. 429/231.95; 429/218.1; 429/221; 429/231.1; 429/231.3; 429/232; 423/306; 423/594.15; 423/594.2; 423/594.6
(58) Field of Search .................. 429/218.1, 221, 429/231.4, 231.6, 231.95, 232, 231.1, 231.3, 231.9; 252/182.1; 423/312, 313, 641, 306, 179.5, 594.15, 594.2, 594.4, 594.6, 596

(56) References Cited

U.S. PATENT DOCUMENTS

| | | | |
|---|---|---|---|
| 4,888,161 A | * 12/1989 | Adams et al. | ............. 423/430 |
| 5,326,545 A | 7/1994 | Koksbang | |
| 5,770,018 A | 6/1998 | Saidi | |
| 5,871,866 A | 2/1999 | Barker et al. | |
| 5,976,489 A | 11/1999 | Saidi et al. | |
| 6,174,623 B1 | 1/2001 | Shackle | |
| 6,528,033 B1 | * 3/2003 | Barker et al. | ............. 423/306 |
| 2003/0215715 A1 | * 11/2003 | Barker et al. | ............. 429/232 |
| 2004/0033360 A1 | * 2/2004 | Armand et al. | ............. 428/408 |

FOREIGN PATENT DOCUMENTS

WO     WO 02/27823    * 4/2004

OTHER PUBLICATIONS

Dahn, J.R., et al., "Structure and Electrochemistry of Li $1+l-y$ NiO2 and a new Li2NiO2 phase with the Ni(OH)2 Structure," Solid State Ionics 44 (1990), 87–97.*

* cited by examiner

*Primary Examiner*—Jonathan Crepeau
(74) *Attorney, Agent, or Firm*—Cynthia S. Kovacevic; Roger A. Williams; Michael D. Ross

(57) ABSTRACT

A method for making an active material comprises the steps of forming a slurry, spray drying the slurry to form a powdered precursor composition, and heating the powdered precursor composition at a temperature and for a time sufficient to form a reaction product. The slurry has a liquid phase and a solid phase, and contains at least an alkali metal compound and a transition metal compound. Preferably the liquid phase contains dissolved alkali metal compound, and the solid phase contains an insoluble transition metal compound, an insoluble carbonaceous material compound, or both. Electrodes and batteries are provided that contain the active materials.

39 Claims, No Drawings

METHOD OF SYNTHESIZING ELECTROCHEMICALLY ACTIVE MATERIALS FROM A SLURRY OF PRECURSORS

FIELD OF THE INVENTION

The invention described herein relates to electroactive materials, electrodes and batteries. In particular, the invention relates to methods for synthesizing electrochemically active materials containing alkali metals and transition metals.

BACKGROUND OF THE INVENTION

A wide variety of electrochemical cells or "batteries" is known in the art. In general, batteries are devices that convert chemical energy into electrical energy, by means of an electrochemical oxidation-reduction reaction. Batteries are used in a wide variety of applications, particularly as a power source for devices that cannot practicably be powered by centralized power generation sources (e.g., by commercial power plants using utility transition lines).

Batteries can generally be described as comprising three components: an anode that contains a material that is oxidized (yields electrons) during discharge of the battery (i.e., while it is providing power); a cathode that contains a material that is reduced (accepts electrons) during discharge of the battery; and an electrolyte that provides for transfer of ions between the cathode and anode. During discharge, the anode is the negative pole of the battery, and the cathode is the positive pole. Batteries can be more specifically characterized by the specific materials that make up each of these three components. Selection of these components can yield batteries having specific voltage and discharge characteristics that can be optimized for particular applications.

Batteries containing lithium and sodium afford many potential benefits, because these metals are light in weight, while possessing high standard potentials. For a variety of reasons, lithium batteries are, in particular, commercially attractive because of their high energy density, higher cell voltages, and long shelf-life.

Lithium batteries are prepared from one or more lithium electrochemical cells containing electrochemically active (electroactive) materials. Among such batteries are those having metallic lithium anodes and metal chalcogenide (oxide) cathodes, typically referred to as "lithium metal" batteries. The electrolyte typically comprises a salt of lithium dissolved in one or more solvents, typically non-aqueous aprotic organic solvents. Other electrolytes are solid electrolytes (typically polymeric matrixes) that contain an ionic conductive medium (typically a lithium containing salt dissolved in organic solvents) in combination with a polymer that itself may be ionically conductive but electrically insulating.

A lithium battery that uses an "insertion anode" rather than lithium metal is typically referred to as a "lithium ion" battery. Insertion or "intercalation" electrodes contain materials having a lattice structure into which an ion can be inserted and subsequently extracted. Rather than chemically altering the intercalation material, the ions slightly expand the internal lattice lengths of the compound without extensive bond breakage or atomic reorganization. Insertion anodes contain, for example, lithium metal chalcogenide, lithium metal oxide, or carbon materials such as coke and graphite. These negative electrodes are used with lithium-containing insertion cathodes. In their initial condition, the cells are not charged, since the anode does not contain a source of cations. Thus, before use, such cells must be charged in order to transfer cations (lithium) to the anode from the cathode. During discharge the lithium is then transferred from the anode back to the cathode. During subsequent recharge, the lithium is again transferred back to the node where it reinserts. This back-and-forth transport of lithium ions (Li+) between the anode and cathode during charge and discharge cycles has led to these cells as being called "rocking chair" batteries.

A variety of materials have been suggested for use as cathode active materials in lithium batteries. Such materials include, for example, $MoS_2$, $MnO_2$, $TiS_2$, $NbSe_3$, $LiCoO_2$, $LiNiO_2$, $LiMn_2O_4$, $V_6O_{13}$, $V_2O_5$, $SO_2$, and $CuCl_2$. Transition metal oxides such as those of the general formula $Li_xM_2O_y$, are among those materials preferred in such batteries having intercalation electrodes. Other materials include lithium transition metal phosphates, such as $LiFePO_4$, and $Li_3V_2(PO_4)_3$. Such materials having structures similar to olivine or NASICON materials are among those known in the art.

In general, such a cathode material must exhibit a high free energy of reaction with lithium, be able to intercalate a large quantity of lithium, maintain its lattice structure upon insertion and extraction of lithium, allow rapid diffusion of lithium, afford good electrical conductivity, not be significantly soluble in the electrolyte system of the battery, and be readily and economically produced. However, many of the cathode materials known in the art lack one or more of these characteristics.

Transition metal oxide and transition metal phosphate active materials are typically synthesized in a solid state reaction. Starting materials in particle form are mixed to produce an intimate mixture of particles. When heat is applied to effect reaction, the solid particles react with one another through a variety of surface reactions accompanied by diffusion of reactive materials into and out of the various particles in the mixture. For this reason, it is preferred to mix particle mixtures with as close a degree of contact as possible between the particles together with a desirable particle size. To accomplish this, the particle mixtures are typically prepared by methods such as ball-milling or physical mixing. Because the active material particles may be relatively large and/or the sizes may be non-uniform, optimum conditions of surface to surface contact between particles is often not achieved.

Close particle contact is also important when the mixture of starting materials contains elemental carbon or other particulate material that serves as a reductant during the solid state reaction. For these reasons, it would be desirable to provide a new method for synthesizing battery active materials wherein a uniform mixture of very fine particles is heated, optionally in the presence of reducing agent, to produce a reaction product.

SUMMARY OF THE INVENTION

In one aspect, the compositions provided by the invention find use as active materials for electrodes and batteries, especially in lithium ion rechargeable battery applications. Such materials can be made by a process comprising the step of heating a powdered precursor composition. The powdered precursor composition is in turn prepared by spray drying a slurry; the slurry containing at least one alkali metal compound, and at least one compound containing a transition metal. In some embodiments, the slurry further comprises a carbonaceous material and/or additional anions including without limitation phosphate, hydrogen phosphate, di-hydrogen phosphate, sulfate, silicate, arsenate, and the like, which are further described below. In a preferred embodiment, the slurry comprises a liquid phase made of solvent and soluble alkali metal compounds including the optional anions discussed above and a solid phase that contains an insoluble transition metal compound or an insoluble carbonaceous material, or both.

In another aspect, a method for making an active material of the invention is provided comprising the steps of forming a slurry comprising a liquid phase and a solid phase, wherein the slurry comprises at least an alkali metal compound and a transition metal compound, spray drying the slurry to form a powdered precursor composition, and heating the powdered precursor composition at a temperature and for a time sufficient to form a reaction product. Preferably the slurry contains a liquid phase having dissolved alkali metal compound, and a solid phase made up of an insoluble transition metal compound or an insoluble carbonaceous material compound or both. In another aspect of the invention, electrodes and batteries are provided that contain the active materials of the invention.

In another aspect, powdered precursor compositions useful for making active materials for batteries are provided. The precursor composition is in the form of particles having an average diameter of less than 100 micrometers and characterized in that most of the particles contain at least one compound that is a source of alkali metal and at least one compound that is a source of transition metal. The small size of the particles, and the intimate mixing of the alkali metal source and transition metal source within the particles, leads to high quality active materials upon heating to effect reaction.

In another aspect, slurries are provided that are useful for forming active materials for batteries through a process of spray drying and heating a powdered precursor composition as described above. The slurry contains a liquid phase and a solid phase. In a preferred embodiment, the liquid phase is made of at least one solvent, soluble alkali metal ions, and a soluble anion such as those selected from the group consisting of phosphate, hydrogen phosphate, di-hydrogen phosphate, silicate, sulfate, and the like. In a preferred embodiment, the solid phase contains at least one transition metal. The molar ratio of alkali metal to transition metal in the slurry varies according to the stoichiometry of the compound being synthesized. It preferably ranges from about 1:5 to about 5:1, and more preferably from about 1:3 to about 3:1. Alternatively, the slurries of the invention are made of a liquid phase comprising solvent and soluble alkali metal ions, and a solid phase comprising at least an insoluble carbonaceous material. The solid phase may further comprise an insoluble transition metal compound.

DETAILED DESCRIPTION OF THE INVENTION

A variety of materials may be made by the process of the invention. In one preferred embodiment, the active materials contain phosphates or similar moieties. Thus, the present invention provides active materials (herein "electrode active materials") comprising lithium or other alkali metals, a transition metal, a phosphate or similar moiety, and optionally a halogen or hydroxyl moiety. Such electrode active materials include those of the formula $A_aM_b(XY_4)_cZ_d$ wherein a, b, and c are greater than zero and d is greater than or equal to zero. (As used herein, the word "include," and its variants, is intended to be non-limiting, such that recitation of items in a list is not to the exclusion of other like items that may also be useful in the materials, compositions, devices, and methods of this invention.)

"A" is selected from the group consisting of Li (lithium), Na (sodium), K (potassium), and mixtures thereof. In a preferred embodiment, "A" is Li, or a mixture of Li with Na, a mixture of Li with K, or a mixture of Li, Na and K. In another preferred embodiment, "A" is Na, or a mixture of Na with K. Preferably "a" is from about 0.1 to about 6, more preferably from about 0.2 to about 6. Where c=1, "a" is preferably from about 0.1 to about 3, preferably from about 0.2 to about 2. In a preferred embodiment, where c=1, "a" is less than about 1. In another preferred embodiment, where c=1, "a" is about 2. Where c=2, "a" is preferably from about 0.1 to about 6, preferably from about 1 to about 6. Where c=3, "a" is preferably from about 0.1 to about 6, preferably from about 2 to about 6, and more preferably from about 3 to about 6.

"M" comprises one or more metals, comprising at least one transition metal capable of undergoing oxidation to a higher valence state (e.g., $Fe^{2+} \rightarrow Fe^{3+}$). In a preferred embodiment, removal of alkali metal from the electrode active material is accompanied by a change in oxidation state of at least one of the metals comprising M. The amount of said metal that is available for oxidation in the electrode active material determines the amount of alkali metal that may be removed. Such concepts are, in general, well known in the art, e.g., as disclosed in U.S. Pat. No. 4,477,541, Fraioli, issued Oct. 16, 1984; and U.S. Pat. No. 6,136,472, Barker, et al., issued Oct. 24, 2000, both of which are incorporated by reference herein.

As referred to herein, "Group" refers to the Group numbers (i.e., columns) of the Periodic Table as defined in the current IUPAC Periodic Table. See, e.g., U.S. Pat. No. 6,136,472, Barker et al., issued Oct. 24, 2000, incorporated by reference herein. Also as referred to herein, "transition metal" will refer to elements of Groups 4–11 of the Periodic Table, while "non-transition metal" will refer to elements from Groups 2, 12, or 14 of the Periodic Table, excluding C and Si.

In a preferred embodiment, "M" comprises one or more transition metals from Groups 4 to 11. In another embodiment, "M" further comprises one or more non-transition metals. In preferred embodiments, the non-transition metals include those that have a +2 oxidation state. Thus, "M" may be represented by $MI_x MII_{1-x}$, where "MI" comprises a transition metal and "MII" a non-transition metal, and x is greater than zero. Preferably, x is greater than or equal to about 0.5, more preferably greater than or equal to about 0.8, and more preferably greater than or equal to about 0.9. Preferred transition metals include the first row transition series (the 4th Period of the Periodic Table), selected from the group consisting of Ti, V, Cr, Mn, Fe, Co, Ni, Cu, and mixtures thereof. Particularly preferred transition metals useful here include Fe, Co, Mn, Cu, V, Cr, and mixtures thereof. Mixtures of transition metals may also be used. Although, a variety of oxidation states for such transition metals are available, in some embodiments it is preferred that the transition metals have a +2 oxidation state. In a preferred embodiment, the transition metal is Fe.

M may also comprise non-transition metals and metalloids. Among such preferred non-transition elements are those selected from the group consisting of Be (Beryllium), Mg (Magnesium), Ca (Calcium), Sr (Strontium), Ba (Barium) and Zn (Zinc) or combinations thereof and more preferably are selected from the group consisting of Mg, Ca, Zn or combinations thereof.

As further discussed herein, "b" is selected so as to maintain electroneutrality of the electrode active material. Preferably, "b" may range from about 0.8 to about 3, more preferably from about 0.8 to 2. In a preferred embodiment, where c=1, "b" is from about 1 to about 2, preferably about 1. In another preferred embodiment, where c=2, "b" is from about 2 to about 3, preferably about 2.

$XY_4$ is selected from the group consisting of $X'O_{4-x}Y'_x$, $X'O_{4-y}Y'_{2y}$, $X"S_4$, and mixtures thereof, where X' is P (phosphorus), As (arsenic), Sb (antimony), Si (silicon), Ge (germanium), V (vanadium), S (sulfur), or mixtures thereof; X" is P, As, Sb, Si, V, Ge or mixtures thereof. In a preferred embodiment, X' and X" are, respectively, selected from the group consisting of P, Si, and mixtures thereof. In a particularly preferred embodiment, X' and X" are P. Y' is halogen (preferably fluorine), N, or S. Representative examples of moieties $XY_4$ include, without limitation, phosphate, silicate, sulfate, and arsenate. Other non-limiting examples include germanate, antimonate, and vanadate, as well as sulfur containing analogs of any of the foregoing.

Y' is selected from the group consisting of halogen, S, N, and mixtures thereof. Preferably Y' is F (fluorine). In a preferred embodiment $0 \leq x \leq 3$; and $0 < y \leq 2$, such that a portion of the oxygen (O) in the $XY_4$ moiety is substituted with halogen. In another preferred embodiment, x and y are 0. In a particularly preferred embodiment $XY_4$ is $X'O_4$, where X' is preferably P or Si, more preferably P. In another particularly preferred embodiment, $XY_4$ is $PO_{4-x}Y'_x$, where Y' is halogen and $0 < x \leq 1$. Preferably $0.01 \leq x \leq 0.05$, more preferably $0.02 \leq x \leq 0.03$.

In preferred embodiments of this invention, $XY_4$ is $PO_4$ (phosphate), or a mixture of $PO_4$ with another $XY_4$ group (i.e., where X' is not P, Y' is not O, or both, as defined above). When part of the phosphate group is substituted, it is preferred that the substitute group be present in a minor amount relative to the phosphate. In a preferred embodiment, $XY_4$ comprises 80% or more phosphate and up to about 20% of one or more phosphate substitutes. Phosphate substitutes include, without limitation, silicate, sulfate, antimonate, germanate, arsenate, monofluoromonophosphate, difluoromonophosphate, sulfur analogs thereof, and combinations thereof. Preferably, $XY_4$ comprises a maximum of about 10% of a phosphate substitute or substitutes. (The percentages are based on mole percent.) Preferred $XY_4$ groups include those of the formula $(PO_4)_{1-k}(B)_k$, where B represents an $XY_4$ group or combination of $XY_4$ groups other than phosphate, and $k \leq 0.5$. Preferably, $k \leq 0.8$, more preferably less than about $k \leq 0.2$, more preferably $k \leq 0.1$.

Z is OH, halogen, or mixtures thereof. In a preferred embodiment Z is selected from the group consisting of OH (hydroxyl), F (fluorine), Cl (chlorine) Br (bromine) and mixtures thereof. In a preferred embodiment, Z is OH. In another preferred embodiment Z is F, or mixtures of F with OH, Cl, or Br. In a preferred embodiment, d=0. In another preferred embodiment, d>0, preferably from about 0.1 to about 6, more preferably from about 0.2 to about 6. In such embodiments where d>0, where c=1, "d" is preferably from about 0.1 to about 3, and more preferably from about 0.2 to about 2. In a preferred embodiment, where c=1, "d" is about 1. Where c=2, "d" is preferably from about 0.1 to about 6, and more preferably from about 1 to about 6. Where c=3, "d" is preferably from about 0.1 to about 6, preferably from about 2 to about 6, and more preferably from about 3 to about 6.

The composition of M, X, Y, and Z and the values of a, b, c, d, x and y, are selected so as to maintain electroneutrality of the electrode active material. As referred to herein "electroneutrality" is the state of the electrode active material wherein the sum of the positively charged species (e.g., M and X) in the material is equal to the sum of the negatively charged species (e.g., Y and Z) in the material. Preferably, the $XY_4$ moieties are comprised to be, as a unit moiety, an anion having a charge of −2, −3, or −4, depending on the selection of X. When $XY_4$ represents a combination of groups, the negative charge contributed by the $XY_4$ groups may take on non-integer values.

Various compositions as described above are disclosed in U.S. Ser. No. 09/908,480 filed Jul. 18, 2001, now U.S. Pat. No. 6,723,470, which is a Continuation-In-Part of U.S. Ser. No. 09/484,799 filed Jan. 18, 2000. Both of these US applications are hereby incorporated by reference herein.

In one aspect, the active materials are lithium metal phosphates of general formula $$Li_aM_bPO_4$$

with "M" as defined above. In a preferred embodiment, "a" is from about 0.3 to about 1.2, preferably from about 0.8 to 1.2, and "b" is from about 0.8 to about 1.2. In one embodiment, "a" and "b" are both about 1. When "b" is about 1, the active materials may be written as $Li_aMI_x MII_{1-x}PO_4$, where x is greater than zero. MI comprises a transition metal, preferably V, Cr, Mn, Fe, Co, Ni, Mo or combinations thereof, and more preferably Fe, Co, or a combination of Fe and Co. MII comprises a non-transition metal, preferably Be, Mg, Ca, Sr, Ba, Zn, or combinations thereof, more preferably Mg, Ca, Zn, or combinations thereof. In one preferred embodiment, MI is Fe, MII is Mg, and x is greater than 0.5. In another embodiment, x is greater than or equal to about 0.8; in yet another embodiment, x is greater than or equal to about 0.9. Preferably, x is less than or equal to about 0.95.

Other embodiments of phosphate materials that can be made with the methods of the invention can be represented by the formula $$A_aM_b(PO_4)_cZ_d$$

wherein A is an alkali metal or mixture of alkali metals, M comprises at least one transition metal capable of undergoing oxidation to a higher oxidation state than in the general formula, Z is selected from the group consisting of halogen, hydroxide, and combinations thereof, a, b, and c are greater than zero and d is zero or greater. Examples of such phosphates are given below.

In one embodiment, the active material comprises a compound of the formula $$Li_aM_b(PO_4)Z_d,$$

wherein (a) $0.1 < a \leq 4$;
(b) M is $M'_{1-m}M"_m$, where M' is at least one transition metal from Groups 4 to 11 of the Periodic Table; M" is at least one element which is from Group 2, 12 or 14, of the Periodic Table, $0 < m < 1$, and $1 \leq b \leq 3$; and
(c) Z comprises halogen, and $0 \leq d \leq 4$, preferably $0.1 \leq d \leq 4$;

wherein M, Z, a, b, and d are selected so as to maintain electroneutrality of said compound. Preferably, M' is selected from the group consisting of Fe, Co, Ni, Mn, Cu, V, Ti, Cr, and mixtures thereof; more preferably M' is selected from the group consisting of Fe, Co, Mn, V, Cr, and mixtures thereof. Preferably, M" is selected from the group consisting of Mg, Ca, Zn, Sr, Cd, Sn, Ba, Be, and mixtures thereof; more preferably M" is selected from the group consisting of Mg, Ca, Zn, Ba, and mixtures thereof. Preferably Z comprises F.

Another preferred embodiment comprises a compound of the formula

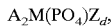

wherein
(a) A is selected from the group consisting of Li, Na, K, and mixtures thereof;
(b) M is $M'_{1-b}M''_b$, where M' is at least one transition metal from Groups 4 to 11 of the Periodic Table; and M" is at least one element which is from Group 2, 12, or 14 of the Periodic Table, and $0 \leq b < 1$; and
(c) Z comprises halogen, and $0 \leq d \leq 2$, preferably $0.1 < d \leq 2$; and
wherein M, Z, b, and d are selected so as to maintain electroneutrality of said compound.

Preferably A is Li, or mixtures of Li with Na, K, or mixtures of Na and K. Preferably, M' is selected from the group consisting of Fe, Co, Mn, Cu, V, Ti, Cr, and mixtures thereof; more preferably M' is selected from the group consisting of Fe, Co, Mn, Cu, V, Cr, and mixtures thereof. Preferably, M" is selected from the group consisting of Mg, Ca, Zn, Sr, Cd, Sn, Ba, Be, and mixtures thereof, more preferably, M" is selected from the group consisting of Mg, Ca, Zn, Ba, and mixtures thereof. Preferably, Z comprises F. In a preferred embodiment M' comprises Fe or Co, M" is Mg, and X is F. Particularly preferred embodiments are $Li_2Fe_{1-x}Mg_xPO_4F$ and $Li_2Fe_{1-x}Mg_xPO_4$. Preferred electrode active materials include $Li_2Fe_{0.9}Mg_{0.1}PO_4F$, and $Li_2Fe_{0.8}Mg_{0.2}PO_4F$.

Another preferred embodiment comprises a compound of the formula:

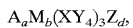

wherein
(a) A is selected from the group consisting of Li, Na, K, and mixtures thereof, and $2 \leq a \leq 9$;
(b) M comprises one or more metals, comprising at least one metal which is capable of undergoing oxidation to a higher valence state, and $1 \leq b \leq 3$;
(c) $XY_4$ is selected from the group consisting of $X'O_{4-x}Y'_x$, $X'O_{4-y}Y'_{2y}$, mixtures thereof, and mixtures thereof with $X''S_4$, where X' is P or a mixture of P with an element selected from the group consisting of As, Sb, Si, Ge, V, S, and mixtures thereof; X" is P or a mixture of P with an element selected from the group consisting of As, Sb, Si, Ge, V, and mixtures thereof; Y' is selected from the group consisting of halogen, S, N, and mixtures thereof, $0 \leq x < 3$; and $0 < y < 4$;
(d) Z is OH, halogen, or mixtures thereof, and $0 \leq d \leq 6$; and
(e) M, $XY_4$, Z, a, b, d, x and y are selected so as to maintain electroneutrality of said compound. In a preferred embodiment, A comprises Li, or mixtures of Li with Na or K.

In another preferred embodiment, A comprises Na, K, or mixtures thereof. In a preferred embodiment, M comprises two or more transition metals from Groups 4 to 11 of the Periodic Table, preferably transition metals selected from the group consisting of Fe, Co, Ni, Mn, Cu, V, Ti, Cr, and mixtures thereof. In another preferred embodiment, M comprises $M'_{1-m}M''_m$, where M' is at least one transition metal from Groups 4 to 11 of the Periodic Table; and M" is at least one element from Groups 2, 12 and 14 of the Periodic Table; and $0 < m < 1$. Preferably, M' is selected from the group consisting of Fe, Co, Ni, Mn, Cu, V, Ti, Cr, and mixtures thereof; more preferably M' is selected from the group consisting of Fe, Co, Mn, Cu, V, Cr, and mixtures thereof. Preferably, M" is selected from the group consisting of Mg, Ca, Zn, Sr, Cd, Sn, Ba, Be, and mixtures thereof; more preferably, M" is selected from the group consisting of Mg, Ca, Zn, Ba, and mixtures thereof. In a preferred embodiment, $XY_4$ is $PO_4$. In another preferred embodiment, X' comprises As, Sb, Si, Ge, S, and mixtures thereof; X" comprises As, Sb, Si, Ge and mixtures thereof; and $0 < x < 3$. In a preferred embodiment, Z comprises F, or mixtures of F with Cl, Br, OH, or mixtures thereof. In another preferred embodiment, Z comprises OH, or mixtures thereof with Cl or Br.

Non-limiting examples of active materials of the invention include the following: $Li_2Fe_{0.8}Mg_{0.2}PO_4F$; $Li_2Fe_{0.8}Mg_{0.2}PO_4$; $Li_2Fe_{0.5}Co_{0.5}PO_4F$; $Li_3CoPO_4F_2$; $KFe(PO_3F)F$; $Li_2Co(PO_3F)Br_2$; $Li_2Fe(PO_3F_2)F$; $Li_2FePO_4Cl$; $Li_2MnPO_4OH$; $Li_2CoPO_4F$; $Li_2Fe_{0.9}Mg_{0.1}PO_4F$; $Li_2Fe_{0.8}Mg_{0.2}PO_4F$; $Li_{1.25}Fe_{0.9}Mg_{0.1}PO_4F_{0.25}$; $Li_2MnPO_4F$; $Li_2CoPO_4F$; $K_2Fe_{0.9}Mg_{0.1}P_{0.5}As_{0.5}O_4F$; $Li_4Mn_2(PO_4)_3F$; $Li_{1.25}Fe_{0.75}Mg_{0.25}PO_4F_{0.25}$; $Li_{1.75}Mn_{0.8}Mg_{0.2}PO_4F_{0.75}$; $Li_{1.5}FeMg(PO_4)(OH)Cl$; $Li_2Co_{0.75}Mg_{0.25}(PO_4)F$; $LiNaCo_{0.8}Mg_{0.2}(PO_4)F$; $NaKCo_{0.5}Mg_{0.5}(PO_4)F$; $LiNa_{0.5}K_{0.5}Fe_{0.75}Mg_{0.25}(PO_4)F$; $LiFePO_4F$; $LiCrPO_4F$; $LiFePO_4$; $LiFe_{0.9}Mg_{0.1}PO_4$; $LiFe_{0.8}Mg_{0.2}PO_4$; $LiFe_{0.9}Ca_{0.1}PO_4$; $LiFe_{0.8}Ca_{0.2}PO_4$; $LiFe_{0.8}Zn_{0.2}PO_4$; $Li_3Fe_2(PO_4)_3$; $Li_3Mn_2(PO_4)_3$; $Li_3FeMn(PO_4)_3$; $Li_3FeCo(PO_4)_3$; $Li_3V_2SiP_2O_{12}$; $Li_{2.5}V_2P_3O_{11.5}F_{0.5}$; $Li_2V_2P_3O_{11}F$; $Li_{2.5}VMnP_3O_{11.5}F_{0.5}$; $Li_2V_{0.5}Fe_{1.5}P_3O_{11}F$; and mixtures thereof. Preferred active materials include $LiFePO_4$; $LiFe_{0.9}Mg_{0.1}PO_4$; $LiFe_{0.8}Mg_{0.2}PO_4$ and mixtures thereof. Preferred electrode actives include those of the following formulae:

$A_{4+d}M'M''(PO_4)_3Z_d$ where M' is a +3 oxidation state transition or non-transition metal and M" is a +2 oxidation state transition metal or non-transition metal.

$A_{3+d}M'M''(PO_4)_3Z_d$ where M' is a +4 oxidation state transition metal or non-transition and M" is a +2 oxidation state transition metal or non-transition metal.

$A_{3+d}M_2(PO_4)_3Z_d$, where M is a +3 oxidation state transition metal.

$A_{1+d}M_2(PO_4)_3Z_d$, where M is a +4 oxidation state transition metal.

$A_{5+d}M_2(PO_4)_3Z_d$, where M is a +2 oxidation state transition metal, or mixture with a +2 oxidation state non-transition metal.

$A_{3+d}M_2(SiO_4)_2(PO_4)Z_d$, where M is a +4 oxidation state transition metal.

$A_{6-x+d}M_2(SiO_4)_{3-x}(PO_4)_xZ_d$, where M is a +3 oxidation state transition metal.

$A_{4+d}M_2(SiO_4)_3Z_d$, where M is a +4 oxidation state transition metal.

$A_{6+d}M_2(SiO_4)_3Z_d$, where M is a +3 oxidation state transition metal.

$A_{2+d}M_2(SO_4)_3Z_d$, where M is a +2 oxidation state transition metal, or mixture with a +2 oxidation state non-transition metal.

$A_{1+d}M'M''(SO_4)_3Z_d$, where M' is a +2 oxidation state metal; and M" is a +3 oxidation state transition metal.

In another aspect, the active materials of the invention include those that are made by heating a precursor composition in the presence of reducing carbon so that an active material is formed having a transition metal in a lower oxidation state than in the starting precursor composition. Such active materials include many of the phosphate and related materials described above, and also include various alkali metal transition metal oxides. Such transition metal oxides include, without limitation, lithiated molybdenum oxides, lithiated transition metal titanates, lithiated manganese oxides, lithiated cobalt oxides, and lithiated nickel oxides.

In one aspect the active materials of the invention are reaction products containing carbon intimately dispersed through the reaction product. In this aspect, the active materials are prepared by heating a precursor composition containing transition metal compounds, alkali metal compounds, and at least a slight excess of reducing carbon. The reducing carbon may form nucleation sites for the formation of crystals of the active materials of the invention. After reaction, excess reducing carbon is dispersed throughout the reaction product.

In a carbothermal preparation method, a slurry of the invention is prepared that contains a reducing carbon, included in an amount sufficient to reduce the metal ion of one or more of the metal containing starting materials in the powdered precursor composition. The reducing carbon in a preferred embodiment is elemental carbon, available as a powder that can be dispersed into the slurry. Upon spray drying of the slurry, the reducing carbon or elemental carbon is intimately mixed with the other powder starting materials. Reducing carbon may also be supplied by a number of precursor organic materials that can decompose on heating to form a carbon material that can take part in the carbothermal reaction. Preferably, on heating the precursor organic materials form reducing carbon material containing 50 to 100 atom % carbon.

The organic precursor material may be any organic material capable of undergoing pyrolysis or carbonization, or any other decomposition process that leads to a carbonaceous material rich in carbon. Such precursors include in general any organic material, i.e., compounds characterized by containing carbon and at least one other element. Although the organic material may be a perhalo compound containing essentially no carbon-hydrogen bonds, typically the organic materials contain carbon and hydrogen. Other elements, without limitation, such as halogens, oxygen, nitrogen, phosphorus, and sulfur, may be present in the organic material, as long as they do not significantly interfere with the decomposition process or otherwise prevent the reductions from being carried out. One example of a preferred organic material is coke, which contains mostly carbon and hydrogen. Other precursors include, without limitation, organic hydrocarbons, alcohols, esters, ketones, aldehydes, carboxylic acids, sulfonates, and ethers. Preferred precursors include the above species containing aromatic rings, especially the aromatic hydrocarbons such as tars, pitches, and other petroleum products or fractions. As used here, hydrocarbon refers to an organic compound made up of carbon and hydrogen, and containing no significant amounts of other elements. Hydrocarbons may contain impurities having some heteroatoms. Such impurities might result, for example, from partial oxidation of a hydrocarbon or incomplete separation of a hydrocarbon from a reaction mixture or natural source such as petroleum.

Other organic precursor materials include sugars and other carbohydrates, including derivatives and polymers. Examples of polymers include, without limitation, starch, cellulose, and their ether or ester derivatives. Other derivatives include, without limitation, the partially reduced and partially oxidized carbohydrates discussed below. On heating, carbohydrates readily decompose to form carbon and water. The term carbohydrates as used here encompasses the D-, L-, and DL-forms, as well as mixtures, and includes material from natural or synthetic sources.

In one sense as used in the invention, carbohydrates are organic materials that can be written with molecular formula $(C)_m(H_2O)_n$, where m and n are integers. For simple hexose or pentose sugars, m and n are equal to each other. Non-limiting examples of hexoses of formula $C_6H_{12}O_6$ include allose, altose, glucose, mannose, gulose, inose, galactose, talose, sorbose, tagatose, and fructose. Pentoses of formula $C_5H_{10}O_5$ are represented by, without limitation, ribose, arabinose, and xylose. Tetroses include erythrose and threose, while glyceric aldehyde is a triose. Other carbohydrates include the two-ring sugars (di-saccharides) of general formula $C_{12}H_{22}O_{11}$. Examples include, without limitation, sucrose, maltose, lactose, trehalose, gentiobiose, cellobiose, and melibiose. Three-ring (trisaccharides such as raffinose) and higher oligomeric and polymer carbohydrates may also be used. Non-limiting examples include starch and cellulose. As noted above, the carbohydrates readily decompose to carbon and water when heated to a sufficiently high temperature. The water of decomposition tends to turn to steam under the reaction conditions and volatilize.

It will be appreciated that other materials will also tend to readily decompose to $H_2O$ and a material very rich in carbon. Such materials are also intended to be included in the term "carbohydrate" as used in the invention. Such materials include slightly reduced carbohydrates such as, without limitation, glycerol, sorbitol, mannitol, iditol, dulcitol, talitol, arabitol, xylitol, and adonitol, as well as "slightly oxidized" carbohydrates such as, without limitation, gluconic, mannonic, glucuronic, galacturonic, mannuronic, saccharic, manosaccharic, ido-saccharic, mucic, talo-mucic, and allo-mucic acids. The formula of the slightly oxidized and the slightly reduced carbohydrates is similar to that of the carbohydrates.

A preferred carbohydrate is sucrose. Under the reaction conditions, sucrose melts at about 150–180° C. The liquid melt tends to distribute itself among the starting materials. At temperatures above about 450° C., sucrose and other carbohydrates decompose to form carbon and water. The as-decomposed carbon powder is in the form of fresh amorphous fine particles with high surface area and high reactivity.

The organic precursor material may also be an organic polymer. Organic polymers include without limitation, polyolefins such as polyethylene and polypropylene, butadiene polymers, isoprene polymers, vinyl alcohol polymers, furfuryl alcohol polymers, styrene polymers including polystyrene, polystyrene-polybutadiene and the like, divinylbenzene polymers, naphthalene polymers, phenol condensation products including those obtained by reaction with aldehyde, polyacrylonitrile, polyvinyl acetate, as well as cellulose starch and esters and ethers thereof described above.

Materials such as those above and others can be made by a process comprising the step of heating a powdered precursor composition. The powdered precursor composition is provided in the form of particles, wherein the particles have an average size of less than 100 micrometers, and wherein at least a major fraction of the particles contain at least one compound that is a source of alkali metal and at least one compound that is a source of transition metal. Alternatively, the precursor composition particles further comprise a carbonaceous material as described above. In a preferred embodiment, the particle average diameter is less than 50 micrometers. Preferred transition metal compounds include those of vanadium, chromium, manganese, iron, cobalt, nickel, molybdenum, titanium, and combinations thereof, while the preferred alkali metal compounds is lithium. In a preferred embodiment, the particles further comprise at least one compound that is a source of an anion selected from the group consisting of phosphate, hydrogen phosphate, dihydrogen phosphate, and mixtures thereof. In another embodiment, the particles may comprise compounds containing sulfate, hydrogen sulfate, silicate, monofluoromonophosphate, and other anions represented by the $XY_4$ described above with respect to preferred embodiments of active materials. In a preferred embodiment, the alkali metal compound is a lithium compound and the transition metal compound is a compound containing vanadium, chromium, manganese, iron, cobalt, nickel, molybdenum, titanium, or combinations thereof. In a further preferred embodiment, the optional carbonaceous material present in the powder precursor composition is elemental carbon.

As discussed above, active materials of the invention are prepared by heating the powder precursor composition for a time and at a temperature sufficient to form a reaction product. The reaction product may in general be used directly as the active material in the electrodes and rechargeable batteries of the invention.

The powdered precursor composition of the invention is conveniently prepared by spray drying a slurry. As used here, slurry refers to a composition having a liquid phase and a solid phase. The solid phase is dispersed or suspended in the liquid phase in such a way that the composition maintains a uniform structure or stable suspension for a time period sufficient for it to be subsequently used. In the present invention, the slurry is to remain stable for a time sufficient for it to be used in the spray drying process.

The slurry is a physical mixture, distinguishing it from a true solution. As a physical mixture, the slurry can be separated into its liquid and solid components by a variety of physical processes such as centrifugation and filtration. In some embodiments, it may be susceptible to separating upon standing by the working of gravity on the solid particles in the solid phase. The slurries are preferably characterized in that when separation occurs such as by any of the mechanisms above, they can be readily re-suspended or re-dispersed by agitation.

In practice, the slurry is preferably a stable, essentially uniform composition suitable for uses that take advantage of its uniform composition. An example of such a use, as described above, is spray drying. The stability of the slurry may be maintained by physical processes such as constant agitation, or alternatively it may be enhanced by the addition of other compounds or compositions which act as a dispersing agent or suspending agent. Such optional dispersing agents are discussed below.

Slurries of the invention are prepared by combining a number of starting materials with a solvent. The solvent is preferably any liquid such as an organic liquid or water that will disperse or suspend the starting materials so that they may be used in a subsequent spray draying process. Examples of useful organic materials include without limitation ethanol, propanol, isopropanol, butanol, isobutanol, low molecular weight alkanes, low molecular weight ketones, and the like. A preferred solvent is water.

Slurries for preparing active materials of general formula $A_aM_b(XY_4)_cZ_d$ are readily prepared according to the invention. According to the desired values of a, b, c, and d in the product, starting materials are chosen that contain "a" moles of alkali metal A from all sources, "b" moles of metals M from all sources, "c" moles of phosphate (or other $XY_4$ species) from all sources, and "d" moles of halide or hydroxide Z, again taking into account all sources. As discussed below, a particular starting material may be the source of more than one of the components A, M, $XY_4$, or Z. Alternatively it is possible to run the reaction with an excess of one or more of the starting materials. In such a case, the stoichiometry of the product will be determined by the limiting reagent among the components A, M, $XY_4$, and Z. Because in such a case at least some of the starting materials will be present in the reaction product mixture, it is usually desirable to provide the starting materials in molar equivalent amounts.

Sources of alkali metal include any of a number of salts or ionic compounds of lithium, sodium, potassium, rubidium or cesium. Lithium, sodium, and potassium compounds are preferred. Preferably, the alkali metal source is provided in powder or particulate form. A wide range of such materials is well known in the field of inorganic chemistry. Non-limiting examples include the lithium, sodium, and/or potassium fluorides, chlorides, bromides, iodides, nitrates, nitrites, sulfates, hydrogen sulfates, sulfites, bisulfites, carbonates, bicarbonates, borates, phosphates, hydrogen ammonium phosphates, dihydrogen ammonium phosphates, silicates, antimonates, arsenates, germinates, oxides, acetates, oxalates, and the like. Hydrates of the above compounds may also be used, as well as mixtures. In particular, the mixtures may contain more than one alkali metal so that a mixed alkali metal active material will be produced in the reaction.

Sources of metals M include salts or compounds of any of the transition metals, alkaline earth metals, or lanthanide metals, as well as of non-transition metals. The metal compounds include, without limitation, fluorides, chlorides, bromides, iodides, nitrates, nitrites, sulfates, hydrogen sulfates, sulfites, bisulfites, carbonates, bicarbonates, borates, phosphates, hydrogen ammonium phosphates, dihydrogen ammonium phosphates, silicates, antimonates, arsenates, germanates, oxides, hydroxides, acetates, oxalates, and the like. Hydrates may also be used, as well as mixtures of metals, as with the alkali metals, so that alkali metal mixed metal active materials are produced. The metal M in the starting material may have any oxidation state, depending on the oxidation state required in the desired product and the oxidizing or reducing conditions contemplated, as discussed below. The metal sources are chosen so that at least one metal in the final reaction product is capable of being in an oxidation state higher than it is in the reaction product.

Sources of the desired starting material anions such as the phosphates (and similar moieties), halides, and hydroxides include a number of salts or compounds containing positively charged cations in addition to the source of phosphate (or other $XY_4$ species), halide, or hydroxide. Such cations include, without limitation, metal ions such as the alkali metals, alkaline metals, transition metals, or other non-transition metals, as well as complex cations such as ammonium or quaternary ammonium. The phosphate anion in such compounds may be phosphate, hydrogen ammonium phosphate, or dihydrogen ammonium phosphate. Hydrates of any of the above may be used, as can mixtures of the above.

Other sources of phosphate, silicate, sulfate, and other similar moieties include the acids, which are usually available in a liquid form as either the pure compound or a concentrated aqueous solution. A preferred phosphate source, for example, is concentrated orthophosphoric acid, available as approximately an 85% by weight solution in water. Similarly, aqueous sulfuric acid and hydrosilicic may be used.

A starting material may provide more than one of the components A, M, $XY_4$, and Z, as is evident in the list above. In various embodiments of the invention, starting materials are provided that combine, for example, the alkali metal and halide together, or the metal and the phosphate. Thus for example, lithium, sodium, or potassium fluoride may be combined with a metal phosphate such as vanadium phosphate or chromium phosphate, or with a mixture of metal compounds such as a metal phosphate and a metal hydroxide. In one embodiment, a starting material is provided that contains alkali metal, metal, and phosphate. There is flexibility to select starting materials containing any of the components of alkali metal A, metal M, phosphate (or other $XY_4$ moiety), and halide/hydroxide Z, depending on availability. Combinations of starting materials providing each of the components may also be used.

In general, any anion may be combined with the alkali metal cation to provide the alkali metal source starting material, or with the metal M cation to provide the metal M starting material. Likewise, any cation may be combined with the halide or hydroxide anion to provide the source of Z component starting material, and any cation may be used as counterion to the phosphate or similar $XY_4$ component. It is preferred, however, to select starting materials with counterions that give rise to volatile by-products. Thus, it is desirable to choose ammonium salts, carbonates, oxides, hydroxides, and the like where possible. Starting materials with these counterions tend to form volatile by-products such as water, ammonia, and carbon dioxide, which can be readily removed from the reaction mixture.

In a preferred embodiment, $LiH_2PO_4$ or $Li_2HPO_4$ is used as starting material to prepare slurries of the invention. Not only does such a starting material provide a convenient source of both lithium and phosphate but they are highly soluble in water, which is a preferred solvent for making the slurries of the invention.

As noted above, the active materials $A_aM_b(XY_4)_cZ_d$ of the invention can contain a mixture of alkali metals A, a mixture of metals M (preferably containing at least one transition metal of groups 4–11), a mixture of components Z, and a phosphate group representative of the $XY_4$ group in the formula. In another aspect of the invention, the phosphate group can be completely or partially substituted by a number of other $XY_4$ moieties, which will also be referred to as "phosphate replacements" or "modified phosphates". Thus, active materials are provided according to the invention wherein the $XY_4$ moiety is a phosphate group that is completely or partially replaced by such moieties as sulfate $(SO_4)^{2-}$, monofluoromonophosphate, $(PO_3F)^{2-}$, difluoromonophosphate $(PO_2F)^{2-}$, silicate $(SiO_4)^{4-}$, arsenate, antimonate, and germanate. Analogues of the above oxygenate anions where some or all of the oxygen is replaced by sulfur are also useful in the active materials of the invention, with the exception that the sulfate group may not be completely substituted with sulfur. For example thiomonophosphates may also be used as a complete or partial replacement for phosphate in the active materials of the invention. Such thiomonophosphates include the anions $(PO_3S)^{3-}$, $(PO_2S_2)^{3-}$, $(POS_3)^{3-}$, and $(PS_4)^{3-}$. They are most conveniently available as the sodium, lithium, or potassium derivatives.

To synthesize the active materials containing the modified phosphate moieties, it is usually possible to substitute all or part of the phosphate compounds in the starting materials discussed above with a source of the replacement anion. The replacement is done on a stoichiometric basis and the starting materials providing the source of the replacement anions are provided along with the other starting materials as discussed above. Synthesis of the active materials containing the modified phosphate groups proceeds as discussed above, either without redox or under oxidizing or reducing conditions. As was the case with the phosphate compounds, the compound containing the modified or replacement phosphate group or groups may also be a source of other components of the active materials. For example, the alkali metal and/or the mixed metal M may be a part of the modified phosphate compound.

Non-limiting examples of sources of monofluoromonophosphates include $Na_2PO_3F$, $K_2PO_3F$, $(NH_4)_2PO_3F \cdot H_2O$, $LiNaPO_3F \cdot H_2O$, $LiKPO_3F$, $LiNH_4PO_3F$, $NaNH_4PO_3F$, $NaK_3(PO_3F)_2$ and $CaPO_3F \cdot 2H_2O$. Representative examples of sources of difluoromonophosphate compounds include, without limitation, $NH_4PO_2F_2$, $NaPO_2F_2$, $KPO_2F_2$, $Al(PO_2F_2)_3$, and $Fe(PO_2F_2)_3$.

If it is desired to partially or completely substitute phosphorous in the active materials for silicon, it is possible to use a wide variety of silicates and other silicon containing compounds. Thus, useful sources of silicon in the active materials of the invention include orthosilicates, pyrosilicates, cyclic silicate anions such as $(Si_3O_9)^{6-}$, $(Si_6O_{18})^{12-}$ and the like and pyrocenes represented by the formula $[(SiO_3)^{2-}]_n$, for example $LiAl(SiO_3)_2$. Silica or $SiO_2$ may also be used.

Representative arsenate compounds that may be used to prepare the active materials of the invention include $H_3AsO_4$ and salts of the anions $[H_2AsO_4]^-$ and $[HAsO_4]^{2-}$. Sources of antimonate in the active materials can be provided by antimony-containing materials such as $Sb_2O_5$, $M^ISbO_3$ where $M^I$ is a metal having oxidation state +1, $M^{III}SbO_4$ where $M^{III}$ is a metal having an oxidation state of +3, and $M^{II}Sb_2O_7$ where $M^{II}$ is a metal having an oxidation state of +2. Additional sources of antimonate include compounds such as $Li_3SbO_4$, $NH_4H_2SbO_4$, and other alkali metal and/or ammonium mixed salts of the $[SbO_4]^{3-}$ anion.

Sources of sulfate compounds that can be used to partially or completely replace phosphorous in the active materials with sulfur include alkali metal and transition metal sulfates and bisulfates as well as mixed metal sulfates such as $(NH_4)_2Fe(SO_4)_2$, $NH_4Fe(SO_4)_2$ and the like. Finally, when it is desired to replace part or all of the phosphorous in the active materials with germanium, a germanium containing compound such as $GeO_2$ may be used.

To prepare the active materials containing the modified phosphate groups, it suffices to choose the stoichiometry of the starting materials based on the desired stoichiometry of the modified phosphate groups in the final product and prepare the slurries of the invention by blending starting materials together according to the procedures described above with respect to the phosphate materials. Naturally, partial or complete substitution of the phosphate group with any of the above modified or replacement phosphate groups will entail a recalculation of the stoichiometry of the required starting materials.

In one aspect, the moiety $XY_4$ of the active material comprises a substituted group represented by $X'O_{4-x}Y'_x$, where x is less than or equal to 1, preferably less than or equal to about 0.2, and more preferably less than or equal to about 0.1. Such groups may be synthesized by providing starting materials containing, in addition to the alkali metal and other metals, lithium hydrogen phosphate and, optionally, other phosphate and other X'O$_4$ materials, in molar amounts equivalent to the amount necessary to produce a reaction product containing X'O$_4$. Where Y' is F, the starting materials further comprise a source of fluoride in a molar amount sufficient to substitute F in the product as shown in the formula. This is generally accomplished by including at least "x" moles of F in the starting materials. For embodiments where d>0, the fluoride source is used in a molar limiting quantity such that the fluorine is incorporated as a Z-moiety. Sources of F include ionic compounds containing fluoride ion (F$^-$) or hydrogen difluoride ion (HF$_2^-$). The cation may be any cation that forms a stable compound with the fluoride or hydrogen difluoride anion. Examples include +1, +2, and +3 metal cations, as well as ammonium and other nitrogen-containing cations. Ammonium is a preferred cation because it tends to form volatile by-products that are readily removed from the reaction mixture.

Similarly, to make X'O$_{4-x}$N$_x$, starting materials are provided that contain "x" moles of a source of nitride ion. Sources of nitride are among those known in the art including nitride salts such as Li$_3$N and (NH$_4$)$_3$N.

Slurries to make active materials that are alkali transition metal oxides may also be readily prepared according to the invention. Such active materials can be represented by general formula

where A and M are as described above and a, b, and c are non-zero. Preferably, "a" is from about 0.5 to about 4, "b" is from about 0.8 to about 3, and "c" has a value such that it maintains electroneutrality of the compound. Here starting materials are selected that contain at least a source of alkali metal and at least a source of the transition metal M. Preferred anions in the alkali metal compounds and transition metal compounds include those that form volatile by-products when the spray dried powder precursor composition is heated to form the reaction product. Such anions include for example, carbonate, hydrogen carbonate, nitrate, and hydroxide. Examples of transition metal M in the above slurries include without limitation, molybdenum, titanium, manganese, cobalt, nickel, iron, vanadium, and combinations thereof.

As noted above, slurries of the invention are prepared by combining starting materials and solvent to form a slurry having a solid phase and a liquid phase. The liquid phase will generally comprise the solvent and whatever starting material(s) that dissolves in the solvent. In a preferred embodiment, the liquid phase contains at least one anion selected from the group consisting of phosphate, hydrogen phosphate, and dihydrogen phosphate. The solid phase will contain whatever starting materials that do not dissolve in the solvent or alternatively, will contain any species that precipitate while the slurry is being put together. The solid phase will in general contain at least an insoluble transition metal compound. In one aspect, the solid phase will in addition contain an insoluble carbonaceous material as described above.

An advantage of the slurry method, of the present invention, is that starting materials may be used that are not limited to those available as particles. In particular, for the phosphate active materials, phosphoric acid H$_3$PO$_4$ may be used as a starting material. This has an added advantage in that it is considerably cheaper than the phosphate salts generally used in such solid state reactions. Although the slurries are not limited to those containing water, the slurry of the invention will be described below with respect to using water as a solvent.

As a general rule to make slurries of the invention, starting materials are combined in soluble or insoluble forms with the solvent to create the slurry having a solid phase and a liquid phase. In one embodiment it is possible to use soluble materials for all the starting materials and precipitate, for example, a transition metal by adjusting the pH to a basic value. A non-limiting example would be combining iron nitrate, magnesium hydroxide, lithium carbonate, and phosphoric acid in water to form a solution and subsequently adjusting the pH upwards by adding ammonium hydroxide to precipitate iron hydroxide. The slurry is thereafter spray dried and heated to form an active material of the invention.

Alternatively, the starting materials may be combined in such a way as to precipitate one of the materials without the need for an pH adjustment. For example, a soluble transition metal chloride may be combined with a soluble alkali metal carbonate to form a precipitated transition metal carbonate. Thereafter, the transition metal carbonate may be combined for example with an alkali metal phosphate or hydrogen phosphate to form a dispersion that is thereafter spray dried. As an illustration, iron chloride and sodium carbonate may be combined to produce an iron carbonate precipitate. Thereafter the iron carbonate precipitate may be combined with soluble lithium dihydrogen phosphate to form a dispersion of iron carbonate in lithium dihydrogen phosphate. The dispersion or slurry may thereafter be spray dried to form a powdered precursor composition.

In another embodiment, the slurry may be formed by combining the starting materials in water having a high pH so as to simultaneously precipitate a transition metal hydroxide while other starting materials remain solubilized. For example, iron chloride, phosphoric acid, and lithium carbonate may be combined in an aqueous solvent having a high pH. A precipitate of iron hydroxide forms and the other starting materials remain solubilized. The slurry is thereafter spray dried to form a powdered precursor composition.

If the active material to be made is an alkali metal phosphate material as described above, it is preferred to use a soluble alkali metal dihydrogen phosphate as a starting material. A preferred alkali metal dihydrogen phosphate is lithium dihydrogen phosphate. Lithium dihydrogen phosphate may be added directly to the slurry as described above, or it may be formed by combining other starting materials. For example, in a first step H$_3$PO$_4$ and Li$_2$CO$_3$ or LiOH may be combined together to form a lithium dihydrogen phosphate solution. Thereafter an insoluble transition metal oxide such as iron oxide may be added to form a slurry which is subsequently spray dried to form a powder precursor composition. Alternatively, lithium carbonate or lithium hydroxide and an insoluble transition metal oxide may be combined in water to form a slurry to which phosphoric acid is subsequently added. A soluble lithium dihydrogen phosphate is formed in the liquid phase. Some iron phosphate may also be solubilized in the liquid phase The solid phase contains unreacted transition metal oxide and any precipitating species. The slurry may also contain other soluble metals such as, without limitation, magnesium hydroxide.

As noted above, the slurries of the invention may also contain a carbonaceous compound. It is possible to use soluble carbonaceous compounds such as without limitation glycerol, starch, and a variety of sugars. Many useful carbonaceous compounds, however, are not soluble in water or other solvents. These insoluble carbonaceous materials include amorphous carbon, graphites, cokes, hydrocarbons, and the organic polymers noted above. In a preferred embodiment, effective dispersants are used along with insoluble carbonaceous material to form slurries of the invention.

Generally, dispersants are used in the invention to maintain in suspension the solid phase, which generally contains an insoluble metal compound (usually at least one insoluble transition metal compound), an insoluble carbonaceous material, or both. Suitable dispersants include those that are capable of interacting both with the liquid phase and the solid phase of the slurry to maintain a relatively stable dispersion or suspension. In general, dispersants will be those compounds or compositions having both a hydrophilic portion and a hydrophobic portion. Dispersants useful in industry and in forming the slurries of the invention are well known in the art and are selected from the group consisting of nonionic dispersants, anionic dispersants and cationic dispersants. Such materials are commercially available from a variety of sources.

Dispersants used in the invention are generally organic materials that can carbonize and form reducing carbon material when heated in a powdered precursor composition as discussed above. As such, they can supplement or substitute for other added sources of reducing carbon such as the other organic precursor materials noted above.

It is preferred to use anionic dispersants to form the slurries of the invention containing insoluble carbonaceous material and/or insoluble transition metal compounds. Particularly preferred anionic dispersants are those based on sulfates and sulfonates of organic materials. Particularly preferred dispersants include those based on anionic salts of naphthalene sulfonic acid, and those based on anionic salts of naphthalene formaldehyde polymer sulfonic acid. It has been found that such dispersants are capable of dispersing insoluble metal compounds and/or carbonaceous material in the presence of 30–40% by weight solutions of alkali metal phosphates or other materials in water. A commercial example of such a dispersant is Darvan #1, commercially available from R.T. Vanderbilt Co., Norwalk, Conn. In general, the viscosity of the dispersion decreases as more dispersant is added. The dispersant is preferably used at a level sufficient to form a dispersion with a suitable viscosity for processing. Preferably, the dispersant is present at about 1% by weight or greater, based on the total weight of the slurry exclusive of solvent. In a preferred embodiment, the dispersion contains about 2% or more by weight of the dispersant. Generally, levels greater than about 4% by weight may be used, but are not required. Higher levels of dispersant will lead to dispersions of lower viscosity, which may be advantageous under some circumstances. Usually, however, the use of the dispersant is limited by cost considerations to as low a level as practical consistent with good processability of the dispersion in the process. As a general rule, the anionic dispersants do not adversely affect the quality of the active material synthesized, because any excess dispersant is decomposed to a carbonaceous material and volatile gases (such as $SO_2$) upon subsequent heating. The carbonaceous material can participate in subsequent reactions as a reductant.

Preferably these slurries have a relatively high concentration of alkali metal in the liquid phase. These slurries generally also contain a relatively high proportion of transition metal in proportion to the alkali metal, present either in the liquid phase or, as in a preferred embodiment, in the solid phase. In general, the molar ratio of alkali metal to transition metal in the slurry (meaning both the liquid phase and the solid phase) ranges from about 1:5 to about 5:1, preferably from about 1:3 to about 3:1. In a preferred embodiment, the molar ratio of the alkali metal to the transition metal in the slurry ranges from about 1:2 to about 2:1.

The slurries of the invention are spray dried by conventional means to yield a powder precursor composition. The slurry is spray dried by atomizing the slurry to form droplets and contacting the droplets with a stream of gas at a temperature sufficient to evaporate at least a major portion by weight of the solvent used in the slurry. In one embodiment, air can be used to dry the slurries of the invention. In other embodiments, it may be preferable to use a less oxidizing or perhaps an inert gas or gas mixture. For example, an inert gas is preferred when the slurry being dried contains organic solvents. On the other hand, hot air may be suitable for drying aqueous slurries.

Spray drying is preferably conducted using a variety of methods that cause atomization by forcing the slurry under pressure at a high degree of spin through a small orifice, including rotary atomizers, pressure nozzles, and air (or two-fluid) atomizers. The slurry is thereby dispersed into fine droplets. It is dried by a relatively large volume of hot gases, or as described above, sufficient to evaporate the volatile solvent, thereby providing very fine particles of a powdered precursor composition. The particles contain the precursor starting materials intimately and essentially homogeneously mixed. The spray-dried particles appear to have the same uniform composition regardless of their size. In general, each of the particles contains all of the starting materials in the same proportion. Desirably the volatile constituent in the slurry is water. The spray drying may take place preferably in air or in an inert hot gas stream. A preferred hot drying gas is argon, though other inert gases may be used. The temperature at the gas of the outlet of the dryer is preferably greater than about 90–100° C. The inlet gas stream is at an elevated temperature sufficient to remove a major portion of the water with a reasonable drier volume, for a desired rate of dry powder production and particle size. Air inlet temperature, atomize droplet size, and gas flow are factors which may be varied and affect the particle size of the spray dry product and the degree of drying. There may typically be some water or solvent left in the spray dried material. For example, there may be up to 5–15% by weight water. It is preferred that the drying step reduce the moisture content of the material to less than 10% by weight. The amount of solvent removed depends on the flow rate, residence time of the solvent water particles, and contact with the heated air, and also depends on the temperature of the heated air.

Techniques for spray drying are well known in the art. In a non-limiting example, spray drying is carried out in a commercially available spray dryer such as an APV-Invensys PSD52 Pilot Spray Dryer. Typical operating conditions are in the following ranges: inlet temperature 250–350° C.; outlet temperature: 100–120° C.; feed rate: 4–8 liters (slurry) per hour.

In a final step of a preferred embodiment, active materials are prepared by heating the powdered precursor composition as described above for a time and at a temperature sufficient to form a reaction product. The powdered precursor composition may optionally be compressed into a tablet or held together with a binder material to form a closely cohering-reaction mixture. The reaction mixture is then heated in an oven, generally at a temperature of about 400° C. or greater until a reaction product forms. When the starting materials contain hydroxyl for incorporation into the reaction product, the reaction temperature is preferably less than about 400° C. and more preferably about 250° C. or less.

Alternatively, the reaction may be carried out hydrothermally. In a hydrothermal reaction, the powdered precursor composition is mixed with a small amount of liquid such as water and placed in a pressurized bomb. The reaction temperature is limited to that which can be achieved by heating the liquid water under pressure and the particular reaction vessel used.

The reaction may be carried out without redox or if desired under reducing or oxidizing conditions. When the reaction is done without redox, the oxidation state of the metal or mixed metals in the reaction product is the same as in the starting materials in the powdered precursor composition. Oxidizing conditions may be provided by heating the powder precursor composition in the presence of oxygen or air.

The reaction may also be carried out with reduction. For example the reaction may be carried out in a reducing atmosphere such as hydrogen, ammonia, methane, or a mixture of reducing gases. The reaction may also be carried out with reduction in the case where the powdered precursor composition contains a carbonaceous material as discussed above. In that situation, the powdered precursor composition contains a reductant that will participate in the reaction to reduce a transition metal, but that will produce by-products that will not interfere with the active material when used later in an electrode or an electrochemical cell. When the powdered precursor composition contains a reducing carbon, it is preferred to carry out the reaction in an inert atmosphere such as argon, nitrogen or carbon dioxide.

When the reaction is carried out under reducing conditions, the reducing agent is generally used in excess. In the case of reducing gases and reducing carbon, any excess reducing agent does not present a problem in the active materials. In the former case, the gas is volatile and is readily separated from the reaction mixture. In the latter, the excess carbon in the reaction product does not harm the properties of the active material, because carbon is generally added to the active material to form an electrode material for use in the electrochemical cells and batteries of the invention. Conveniently, the by-products carbon monoxide or carbon dioxide (in the case of a reducing carbon) or water (in the case of hydrogen) are readily removed from the reaction mixture.

The carbothermal reduction method of synthesis of mixed metal phosphates has been described in PCT Publication WO/01/53198, Barker et al., incorporated by reference herein. The carbothermal method may be used to react starting materials in the presence of reducing carbon to form a variety of products. The carbon functions to reduce a metal ion in the starting material metal M source. The reducing carbon, for example in the form of elemental carbon powder, is mixed with the other starting materials in the preparation of slurries of the invention, as discussed above. For best results, the temperature should be about 400° C. or greater, and up to about 950° C. Higher temperatures may be used, but are usually not required.

Generally, higher temperature (about 650° C. to about 1000° C.) reactions produce CO as a by-product whereas $CO_2$ production is favored at lower temperatures (generally up to about 650° C.). The higher temperature reactions produce CO effluent and the stoichiometry requires more carbon be used than the case where $CO_2$ effluent is produced at lower temperature. This is because the reducing effect of the C to $CO_2$ reaction is greater than the C to CO reaction. The C to $CO_2$ reaction involves an increase in carbon oxidation state of +4 (from 0 to 4) and the C to CO reaction involves an increase in carbon oxidation state of +2 (from ground state zero to 2). In principle, such would affect the planning of the reaction, as one would have to consider not only the stoichiometry of the reductant but also the temperature of the reaction. When an excess of carbon is used, however, such concerns do not arise. It is therefore preferred to use an excess of carbon, and control the stoichiometry of the reaction with another starting materials as the limiting reagent.

It is preferred to heat the precursors at a ramp rate in a range from a fraction of a degree to about 20° C. per minute. The ramp rate is to be chosen according to the capabilities of the equipment on hand and the desired turnaround or cycle time. As a rule, for faster turnaround it is preferred to heat up the sample at a relatively fast rate. High quality materials may be synthesized, for example, using ramp rates of 2° C./min, 4° C./min, 5° C./min and 10° C./min. Once the desired temperature is attained, the reactions are held at the reaction temperature for about 10 minutes to several hours, depending on the reaction temperature chosen. The heating may be conducted under an air atmosphere, or if desired may be conducted under a non-oxidizing or inert atmosphere or a reducing atmosphere as discussed earlier. After reaction, the products are cooled from the elevated temperature to ambient (room) temperature. The rate of cooling is selected depending on, among other factors, the capabilities of the available equipment, the desired turnaround time, and the effect of cooling rate on the quality of the active material. It is believed that most active materials are not adversely affected by a rapid cooling rate. The cooling may desirably occur at a rate of up to 50° C./minute or higher. Such cooling has been found to be adequate to achieve the desired structure of the final product in some cases. It is also possible to quench the products at a cooling rate on the order of about 100° C./minute. A generalized rate of cooling has not been found applicable for certain cases, therefore the suggested cooling requirements vary.

The present invention also provides electrodes comprising an electrode active material of the present invention. In a preferred embodiment, the electrodes of the present invention comprise an electrode active material of this invention, a binder; and an electrically conductive carbonaceous material.

In a preferred embodiment, the electrodes of this invention comprise:

(a) from about 25% to about 95%, more preferably from about 50% to about 90%, active material;

(b) from about 2% to about 95% electrically conductive material (e.g., carbon black); and (c) from about 3% to about 20% binder chosen to hold all particulate materials in contact with one another without degrading ionic conductivity.

(Unless stated otherwise, all percentages herein are by weight.) Cathodes of this invention preferably comprise from about 50% to about 90% of active material, about 5% to about 30% of the electrically conductive material, and the balance comprising binder. Anodes of this invention preferably comprise from about 50% to about 95% by weight of the electrically conductive material (e.g., a preferred graphite), with the balance comprising binder.

Electrically conductive materials among those useful herein include carbon black, graphite, powdered nickel, metal particles, conductive polymers (e.g., characterized by a conjugated network of double bonds like polypyrrole and polyacetylene), and mixtures thereof. Binders useful herein preferably comprise a polymeric material and extractable plasticizer suitable for forming a bound porous composite. Preferred binders include halogenated hydrocarbon polymers, such as poly(vinylidene chloride) and poly ((dichloro-1,4-phenylene)ethylene), fluorinated urethanes, fluorinated epoxides, fluorinated acrylics, copolymers of halogenated hydrocarbon polymers, epoxides, ethylene propylene diamine termonomer (EPDM), ethylene propylene diamine termonomer (EPDM), polyvinylidene difluoride (PVDF), hexafluoropropylene (HFP), ethylene acrylic acid copolymer (EAA), ethylene vinyl acetate copolymer (EVA), EAA/EVA copolymers, PVDF/HFP copolymers, and mixtures thereof.

In a preferred process for making an electrode, the electrode active material is mixed into a slurry with a polymeric binder compound, a solvent, a plasticizer, and optionally the electroconductive material. The active material slurry is appropriately agitated, and then thinly applied to a substrate via a doctor blade. The substrate can be a removable substrate or a functional substrate, such as a current collector (for example, a metallic grid or mesh layer) attached to one side of the electrode film. In one embodiment, heat or radiation is applied to evaporate the solvent from the electrode film, leaving a solid residue. The electrode film is further consolidated, where heat and pressure are applied to the film to sinter and calendar it. In another embodiment, the film may be air-dried at moderate temperature to yield self-supporting films of copolymer composition. If the substrate is of a removable type it is removed from the electrode film, and further laminated to a current collector. With either type of substrate it may be necessary to extract the remaining plasticizer prior to incorporation into the battery cell.

The batteries of the present invention comprise:

(a) a first electrode comprising an active material of the present invention;

(b) a second electrode which is a counter-electrode to said first electrode; and (c) an electrolyte between said electrodes.

The electrode active material of this invention may comprise the anode, the cathode, or both. Preferably, the electrode active material comprises the cathode.

The active material of the second, counter-electrode is any material compatible with the electrode active material of this invention. In embodiments where the electrode active material comprises the cathode, the anode may comprise any of a variety of compatible anodic materials well known in the art, including lithium, lithium alloys, such as alloys of lithium with aluminum, mercury, manganese, iron, zinc, and intercalation based anodes such as those employing carbon, tungsten oxides, and mixtures thereof. In a non-limiting preferred embodiment, the anode comprises:

(a) from about 0% to about 95%, preferably from about 25% to about 95%, more preferably from about 50% to about 90%, of an insertion material;

(b) from about 2% to about 95% electrically conductive material (e.g., carbon black); and (c) from about 3% to about 20% binder chosen to hold all particulate materials in contact with one another without degrading ionic conductivity.

In a particularly preferred embodiment, the anode comprises from about 50% to about 90% of an insertion material selected from the group active material from the group consisting of metal oxides (particularly transition metal oxides), metal chalcogenides, and mixtures thereof. In another preferred embodiment, the anode does not contain an insertion active, but the electrically conductive material comprises an insertion matrix comprising carbon black, graphite, cokes, mesocarbons and mixtures thereof. One preferred anode intercalation material is carbon, such as coke or graphite, which is capable of forming the compound $Li_xC$. Insertion anodes among those useful herein are described in U.S. Pat. No. 5,700,298, Shi et al., issued Dec. 23, 1997; U.S. Pat. No. 5,712,059, Barker et al., issued Jan. 27, 1998; U.S. Pat. No. 5,830,602, Barker et al., issued Nov. 3, 1998; and U.S. Pat. No. 6,103,419, Saidi et al., issued Aug. 15, 2000; all of which are incorporated by reference herein.

The batteries of this invention also comprise a suitable electrolyte that provides a physical separation but allows transfer of ions between the cathode and anode. The electrolyte is preferably a material that exhibits high ionic conductivity, as well as having insular properties to prevent self-discharging during storage. The electrolyte can be either a liquid or a solid. A liquid electrolyte comprises a solvent and an alkali metal salt that together form an ionically conducting liquid. So called "solid electrolytes" contain in addition a matrix material that is used to separate the electrodes.

One preferred embodiment is a solid polymeric electrolyte, made up of a solid polymeric matrix and a salt homogeneously dispersed via a solvent in the matrix. Suitable solid polymeric matrices include those well known in the art and include solid matrices formed from organic polymers, inorganic polymers or a solid matrix-forming monomer and from partial polymers of a solid matrix forming monomer.

Preferably, the salt of the electrolyte is a lithium or sodium salt. Non-limiting examples include $LiAsF_6$, $LiPF_6$, $LiClO_4$, $LiB(C_6H_5)_4$, $LiAlCl_4$, $LiBr$, $LiBF_4$, and mixtures thereof, as well as sodium analogs, with the less toxic salts being preferable. The salt content is preferably from about 5% to about 65%, and more preferably from about 8% to about 35%. A preferred salt is $LiBF_4$. In a preferred embodiment, the $LiBF_4$ is present at a molar concentration of from 0.5M to 3M, preferably 1.0M to 2.0M, and most preferably about 1.5M. Another preferred salt is $LiPF_6$.

Electrolyte compositions among those useful herein are described in U.S. Pat. No. 5,418,091, Gozdz et al., issued May 23, 1995; U.S. Pat. No. 5,508,130, Golovin, issued Apr. 16, 1996; U.S. Pat. No. 5,541,020, Golovin et al., issued Jul. 30, 1996; U.S. Pat. No. 5,620,810, Golovin et al., issued Apr. 15, 1997; U.S. Pat. No. 5,643,695, Barker et al., issued Jul. 1, 1997; U.S. Pat. No. 5,712,059, Barker et al., issued Jan. 27, 1997; U.S. Pat. No. 5,851,504, Barker et al., issued Dec. 22, 1998; U.S. Pat. No. 6,020,087, Gao, issued Feb. 1, 2001; and U.S. Pat. No. 6,103,419, Saidi et al., issued Aug. 15, 2000; all of which are incorporated by reference herein.

The solvent is preferably a low molecular weight organic solvent added to the electrolyte, which may serve the purpose of solvating the inorganic ion salt. The solvent is preferably a compatible, relatively non-volatile, aprotic, polar solvent. Non-limiting examples include chain carbonates such as dimethyl carbonate (DMC), diethyl carbonate (DEC), dipropylcarbonate (DPC), and ethyl methyl carbonate (EMC); cyclic carbonates such as ethylene carbonate (EC), propylene carbonate (PC) and butylene carbonate; ethers such as diglyme, triglyme, and tetraglyme; lactones; esters, dimethylsulfoxide, dioxolane, sulfolane, and mixtures thereof. Examples of pairs of solvent include EC/DMC, EC/DEC, EC/DPC and EC/EMC.

In a preferred embodiment, the electrolyte solvent contains a blend of two components. The first component contains one or more solvents selected from the group of cyclic carbonates, having a ring size of from 5 to 8. The carbon atoms of the ring may be optionally substituted with $C_1$–$C_6$ carbon chains. Examples of unsubstituted cyclic carbonates are ethylene carbonate (5-membered ring), 1,3-propylene carbonate (6-membered ring), 1,4-butylene carbonate (7-membered ring), and 1,5-pentylene carbonate (8-membered ring). Optionally the rings may be substituted with lower alkyl groups, preferably methyl, ethyl, propyl, or isopropyl groups. Such structures are well known; examples include a methyl substituted 5-membered ring (also known as 1,2-propylene carbonate, or simply propylene carbonate (PC)), and a dimethyl substituted 5-membered ring carbonate (also known as 2,3-butylene carbonate) and an ethyl substituted 5-membered ring (also known as 1,2-butylene carbonate or simply butylene carbonate (BC). Other non-limiting examples include a wide range of methylated, ethylated, and propylated 5–8 membered ring carbonates. In a preferred embodiment, the first component is a 5- or 6-membered ring carbonate. More preferably, the cyclic carbonate has a 5-membered ring. In a particular preferred embodiment, the first component comprises ethylene carbonate.

The second component is selected from the group of cyclic esters, also known as lactones. Preferred cyclic esters include those with ring sizes of 4 to 7. The carbon atoms in the ring may be optionally substituted with $C_1$–$C_3$ chains. Examples of unsubstituted cyclic esters include the 4-membered β-propiolactone (or simply propiolactone); γ-butyrolactone (5-membered ring), δ-valerolactone (6-membered ring) and ε-caprolactone (7-membered ring). Any of the positions of the cyclic esters may be optionally substituted, preferably by methyl, ethyl, propyl, or isopropyl groups. Thus, preferred second components include one or more solvents selected from the group consisting of unsubstituted, methylated, ethylated, or propylate lactones including, but not limited to, propiolactone, butyrolactone, valerolactone, and caprolactone. It will be appreciated that some of the alkylated derivatives of one lactone may be named as a different alkylated derivative of a different core lactone. To illustrate, γ-butyrolactone methylated on the γ-carbon may be named as γ-valerolactone.

In a preferred embodiment, the cyclic ester of the second component has a 5- or a 6-membered ring. Thus, preferred second component solvents include one or more compounds selected from γ-butyrolactone, and δ-valerolactone, as well as methylated, ethylated, and propylated derivatives thereof. Preferably, the cyclic ester has a 5-membered ring. In a particular preferred embodiment, the second component cyclic ester comprises γ-butyrolactone.

The preferred two component solvent system contains the two components in a weight ratio of from 1:20 to a ratio of 20:1. More preferably, the ratios range from 1:10 to 10:1 and more preferably from 1:5 to 5:1. In a preferred embodiment the cyclic ester is present in a higher amount than the cyclic carbonate. Preferably, at least 60% of the two component system is made up of the cyclic ester, and preferably 70% or more. In a particularly preferred embodiment, the ratio of cyclic ester to cyclic carbonate is about 3 to 1. In one embodiment, the solvent system is made up essentially of gamma-butyrolactone and ethylene carbonate. All ratios discussed are by weight unless otherwise indicated. A preferred solvent system thus contains 3 parts by weight gamma-butyrolactone and 1 part by weight ethylene carbonate.

A separator allows the migration of ions while still providing a physical separation of the electric charge between the electrodes, to prevent short-circuiting. The polymeric matrix itself may function as a separator, providing the physical isolation needed between the anode and cathode. Alternatively, the electrolyte can contain a second or additional polymeric material to further function as a separator. In a preferred embodiment, the separator prevents damage from elevated temperatures within the battery that can occur due to uncontrolled reactions preferably by degrading upon high temperatures to provide infinite resistance to prevent further uncontrolled reactions.

A separator membrane element is generally polymeric and prepared from a composition comprising a copolymer. A preferred composition contains a copolymer of a 75 to 92% vinylidene fluoride with 8 to 25% hexafluoropropylene copolymer (available commercially from Atochem North America as Kynar FLEX) and an organic solvent plasticizer. Such a copolymer composition is also preferred for the preparation of the electrode membrane elements, since subsequent laminate interface compatibility is ensured. The plasticizing solvent may be one of the various organic compounds commonly used as solvents for electrolyte salts, e.g., propylene carbonate or ethylene carbonate, as well as mixtures of these compounds. Higher-boiling plasticizer compounds such as dibutyl phthalate, dimethyl phthalate, diethyl phthalate, and tris butoxyethyl phosphate are preferred. Inorganic filler adjuncts, such as fumed alumina or silanized fumed silica, may be used to enhance the physical strength and melt viscosity of a separator membrane and, in some compositions, to increase the subsequent level of electrolyte solution absorption. In a non-limiting example, a preferred electrolyte separator contains about two parts polymer per one part of fumed silica.

A preferred battery comprises a laminated cell structure, comprising an anode layer, a cathode layer, and electrolyte/separator between the anode and cathode layers. The anode and cathode layers comprise a current collector. A preferred current collector is a copper collector foil, preferably in the form of an open mesh grid. The current collector is connected to an external current collector tab. Such structures are disclosed in, for example, U.S. Pat. No. 4,925,752, Fauteux et al, issued May 15, 1990; U.S. Pat. No. 5,011,501, Shackle et al., issued Apr. 30, 1991; and U.S. Pat. No. 5,326,653, Chang, issued Jul. 5, 1994; all of which are incorporated by reference herein. In a battery embodiment comprising multiple electrochemical cells, the anode tabs are preferably welded together and connected to a nickel lead. The cathode tabs are similarly welded and connected to a welded lead, whereby each lead forms the polarized access points for the external load.

Lamination of assembled cell structures is accomplished by conventional means by pressing between metal plates at a temperature of about 120–160° C. Subsequent to lamination, the battery cell material may be stored either with the retained plasticizer or as a dry sheet after extraction of the plasticizer with a selective low-boiling point solvent. The plasticizer extraction solvent is not critical, and methanol or ether are often used.

EXAMPLES

Example 1

An active material of formula $LiFe_{0.95}Mg_{0.05}PO_4$ was made by the following Procedure.

Slurry Formation

In a separate mixer, 3587 grams of $LiH_2PO_4$ (Aldrich) was stirred into 8,250 grams of water. 270 grams Darvan #1 dispersant was added to the mixer operated at 3500 rpm. Next, 2017 grams $Fe_2O_3$ (Aldrich) was added and mixed for 15 minutes at 4500 rpm. Then 100.6 grams $Mg(OH)_2$ was added and mixed for another 15 minutes at 4500 rpm. Next, 445.5 grams carbon (Ensaco) was added and mixed 15 minutes at 4500 rpm. Finally, 5–8 grams of butanol was added and mixed for 5 minutes at 4000 rpm to form a slurry.

Spray Dying

The slurry above was spray dried in an APV PSD52 spray drier. The inlet temperature was 310° C. and the outlet temperature was 100° C. The slurry, containing about 15000 grams with a solids loading of about 45% was spray dried in the above apparatus over a period of 1 hour and 10 minutes. 4,721 grams of powder were recovered.

Synthesis of Active Material 3 kilograms of the powder prepared by spraying the slurry were placed in an oven at room temperature. The sample was heated at a ramp rate of 2 degrees C. per minute until a final temperature of 650 degrees C. was reached. The pellet was maintained at 650 degrees C. for 4 hours. Thereafter, the sample was cooled at a cooling rate of 5 degrees C. per minute until ambient conditions were reached. A powder x-ray diffraction pattern of the reaction product showed that the active material had the expected olivine structure.

Example 2

The active material $LiFe_{0.95}Mg_{0.05}PO_4$ was made by an alternative procedure.

Preparation of Slurry

The following components were used:

| | |
|---|---|
| Water | 4895 grams |
| $Li_2CO_3$ | 850 grams (Pacific Lithium) |
| 85% $H_3PO_4$ | 2653 grams |
| Darvon #1 Dispersant | 180 grams |
| $Fe_2O_3$ | 1745 grams (Aldrich) |
| Magnesium Hydroxide, Mg $(OH)_2$ | 67 grams (Alpha) |
| Carbon | 297 grams (Ensaco) |

All of the solids, except carbon, were dispersed in all of the water plus the dispersant. Then the phosphoric acid was added. When the reaction was finished, the carbon was added. Total mixing time was about 30 minutes. The slurry weight is approximately 10,000 grams with a slurry solids loading of about 45%.

Spray Drying

The slurry prepared in Example 2 was spray dried over the course of 1½ hours in a APV PSD52 spray drier with an inlet temperature at 300° C. and an outlet temperature of 100° C. A rotary atomizer was used. 3,066 grams of powder were recovered.

Synthesis of the Active Material 3000 grams of the powder prepared by spraying the slurry were placed in an oven at room temperature. The sample was heated at a ramp rate of 2 degrees per minute until a final temperature of 650 degrees C. was reached. The material was maintained at 650 degrees C. for 4 hours. Thereafter, the sample was cooled at a cooling rate of 2 degrees per minute until ambient conditions were reached. A powder x-ray diffraction pattern of the reaction product showed that the active material had the expected olivine structure.

The examples and other embodiments described herein are exemplary and not intended to be limiting in describing the full scope of the present invention. Equivalent changes, modifications and variations of specific embodiments, materials, compositions and methods may be made within the scope of the present invention.

What is claimed is:

1. A method of making an active material for a rechargeable battery the active material is represented by the formula

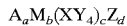

wherein
a is from 0.1 to 6, b is from about 0.8 to about 3, c is from 1 to 3, and d is from 0 to 6;

A is an alkali metal or mixture of alkali metals;

M comprises at least one transition metal capable of being oxidized to a higher oxidation state than in the active material;

Z represents a halogen, hydroxide, or combination thereof; and $XY_4$ is selected from the group consisting of $X'O_{4-x}Y'_x$, $X'O_{4-y}Y'_{2y}$, $X''S_4$, and mixtures thereof, where X' is selected from the group consisting of P, As, Sb, Si, Ge, V, S, and mixtures thereof; X'' is selected from the group consisting of P, As, Sb, Si, V, Ge and mixtures thereof; Y' is halogen, N, or S; $0 \leq x < 3$; and $0 < y < 4$, wherein the composition of M, $XY_4$, A, and Z, and the values a, b, c and d are selected so as to maintain electro-neutrality of the active material comprising forming a slurry comprising a liquid phase and a solid phase, wherein the liquid phase comprises a solvent, alkali metal ions, and at least one anion selected from the group consisting of:

a) phosphate,
b) hydrogen phosphate; and
c) dihydrogen phosphate and the solid phase comprises at least one transition metal and a carbonaceous reducing material present in an amount sufficient to reduce a metal ion of one or more metal compounds of the slurry in a subsequent heating step wherein at least one metal ion present in the slurry is reduced by the carbonaceous material during the subsequent heating step.

2. A method according to claim 1, wherein the molar ratio of alkali metal to transition metal in the slurry is from 1:5 to 5:1.

3. A method according to claim 1, wherein the solvent comprises water.

4. A method according to claim 1, wherein the transition metal is selected from the group consisting of vanadium, chromium, manganese, iron, cobalt, nickel, molybdenum, tungsten, rhenium, osmium, iridium, and mixtures thereof.

5. A method according to claim 1, wherein the alkali metal ions comprise lithium ions.

6. A method according to claim 1, wherein the alkali metal ions comprise lithium ions, the solvent comprises water, and the transition metal is selected from the group consisting of vanadium, chromium, manganese, iron, cobalt, nickel, molybdenum, and mixtures thereof.

7. A method according to claim 1, further comprising a non-transition metal in a +2 oxidation state.

8. A method according to claim 1, wherein the solid phase further comprises a carbonaceous material.

9. A method according to claim 8, wherein the transition metal is selected from the group consisting of vanadium, chromium, manganese, iron, cobalt, nickel, and combinations thereof.

10. A method according to claim 9, further comprising a +2 metal selected from the group consisting of beryllium, magnesium, calcium, strontium, barium, zinc, and mixtures thereof.

11. A method according to claim 8, further comprising an anionic dispersant.

12. A according to claim 11, wherein the anionic dispersant is selected from the group consisting of salts of naphthalene sulfonic acid, salts of naphthalene formaldehyde polymer sulfonic acid, and mixtures thereof.

13. A method for making an active material for a rechargeable battery wherein the active material is represented by the formula

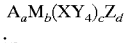

wherein
a is from 0.1 to 6, b is from about 0.8 to about 3, c is from 1 to 3, and d is from 0 to 6;

A is an alkali metal or mixture of alkali metals;

M comprises at least one transition metal capable of being oxidized to a higher oxidation state than in the active material;

Z represents a halogen, hydroxide, or combination thereof; and $XY_4$ is selected from the group consisting of $X'O_{4-x}Y'_x$, $X'O_{4-y}Y'_{2y}$, $X''S_4$, and mixtures thereof, where X' is selected from the group consisting of P, As, Sb, Si, Ge, V, S, and mixtures thereof; X" is selected from the group consisting of P, As, Sb, Si, V, Ge and mixtures thereof; Y' is halogen, N, or S; $0 \leq x < 3$; and $0 < y < 4$, wherein the composition of M, $XY_4$, A, and Z, and the values a, b, c and d are selected so as to maintain electroneutrality of the active material, comprising the steps of:

a) forming a slurry comprising an alkali metal compound, a metal compound containing a transition metal; and a carbonaceous material present in an amount sufficient to reduce a metal ion of one or more metal compounds of the slurry during a subsequent heating step;

b) spray drying the slurry to form a precursor composition; and c) heating the precursor composition at a temperature and for a time sufficient to form a reaction product wherein at least one metal ion of the precursor composition is reduced by the carbonaceous material.

14. A method according to claim 13 wherein the carbonaceous material is selected from the group consisting of elemental carbon, hydrocarbons, carbohydrates, and polymers.

15. A method according to claim 13, wherein the carbonaceous material comprises elemental carbon.

16. A method according to claim 14, wherein the slurry further comprises an anionic dispersant.

17. A method according to claim 16 wherein the dispersant is selected from the group consisting of salts of naphthalene sulfonic acid, salts of sulfonic acids of naphthalene formaldehyde polymers, and mixtures thereof.

18. A method according to claim 17, wherein the dispersant comprises the sodium salt of a naphthalene formaldehyde polymer sulfonic acid.

19. A method according to claim 13, wherein the alkali metal compound comprises a lithium compound.

20. A method according to claim 13, wherein the transition metal is selected from the group consisting of vanadium, chromium, manganese, iron, cobalt, nickel, molybdenum, and mixtures thereof.

21. A method according to claim 13, wherein the alkali metal compound comprises a lithium compound, and the transition metal is selected from the group consisting of vanadium, chromium, manganese, iron, cobalt, nickel, molybdenum, and mixtures thereof.

22. A method according to claim 13, wherein the active material is an alkali metal mixed metal phosphate active material.

23. A method according to claim 13, wherein d is 0.

24. A method according to claim 13, wherein d is greater than zero.

25. A method according to claim 13 wherein $XY_4$ is selected from the group consisting of phosphate, silicate, sulfate, arsenate, and mixtures thereof.

26. A method according to claim 13, wherein the active material is represented by formula $$Li_aM_bPO_4$$

wherein a is from 0.8 to 1.2, b is from 0.8 to 1.2, and M comprises at least one transition metal capable of undergoing oxidation to a higher oxidation state.

27. A method according to claim 26, wherein a and b are about 1.

28. A method according to claim 27, wherein M comprises Fe, Co, or a mixture of Fe and Co.

29. A method according to claim 26, wherein M comprises Fe.

30. A method according to claim 29, wherein M further comprises a +2 non-transition metal.

31. A method according to claim 26, wherein M is $MI_xMII_{1-x}$, wherein MI comprises Fe, Co, or a mixture of Fe and Co, MII comprises Mg, Zn, Ca, Ba, or combinations thereof, and wherein x is greater than or equal about 0.5.

32. A method according to claim 31, wherein x is greater than or equal about 0.8.

33. A method according to claim 32, wherein x is greater than or equal about 0.9.

34. A method according to claim 13, wherein the active material is represented by formula $$Li_aMI_xMII_{1-x}PO_4$$

wherein a is from 0.3 to 1.2, b is from 0.5 to 1.2, MI is selected from the group consisting of vanadium, chromium, manganese, iron, cobalt, nickel, molybdenum, and mixtures thereof; MII is selected from the group consisting of beryllium, magnesium, calcium, strontium, barium, zinc, and mixtures thereof, and x is greater than zero.

35. A method according to claim 34, wherein MI is selected from the group consisting of iron, cobalt, and mixtures thereof and MII is selected from the group consisting of magnesium, calcium, zinc, and mixtures thereof.

36. A method according to claim 34, wherein the active material comprises $$LiFe_xMg_{1-x}PO_4$$

wherein x is greater than or equal to about 0.5.

37. A method according to claim 36, wherein x is greater than or equal to about 0.8.

38. A method according to claim 36, wherein x is greater than or equal to about 0.9.

39. A method according to claim 13, wherein said active material is selected from the group consisting of $LiFePO_4$; $LiFe_{0.9}Mg_{0.1}PO_4$; $LiFe_{0.8}Mg_{0.2}PO_4$; and $LiFe_{0.95}Mg_{0.05}PO_4$.

* * * * *